(12) United States Patent
Tang et al.

(10) Patent No.: US 11,219,833 B2
(45) Date of Patent: Jan. 11, 2022

(54) INFORMATION SYNCHRONIZATION METHOD AND APPARATUS, AND STORAGE MEDIUM

(71) Applicant: Tencent Technology (Shenzhen) Company Limited, Shenzhen (CN)

(72) Inventors: Jun Tang, Shenzhen (CN); Yue Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/026,155

(22) Filed: Sep. 18, 2020

(65) Prior Publication Data

US 2021/0001232 A1    Jan. 7, 2021

Related U.S. Application Data

(63) Continuation of application No. PCT/CN2019/099916, filed on Aug. 9, 2019.

(30) Foreign Application Priority Data

Sep. 7, 2018 (CN) .......................... 201811044015.2

(51) Int. Cl.
*A63F 13/77* (2014.01)
*A63F 13/35* (2014.01)
*A63F 13/52* (2014.01)

(52) U.S. Cl.
CPC .............. *A63F 13/77* (2014.09); *A63F 13/35* (2014.09); *A63F 13/52* (2014.09)

(58) Field of Classification Search
CPC .......... A63F 13/77; A63F 13/35; A63F 13/52; A63F 13/525; A63F 13/31
(Continued)

(56) References Cited

U.S. PATENT DOCUMENTS 8,512,140 B1   8/2013  Omi
10,558,260 B2*  2/2020  Miller .................. G06F 3/0346
(Continued)

FOREIGN PATENT DOCUMENTS

CN   1291318 A   4/2001
CN   104572184 A  4/2015
(Continued)

OTHER PUBLICATIONS

"[World of Warships] Des Moines What Kind of Experience Is It After Bringing the Radar Duration Plug-In", Aug. 7, 2017, retrieved from the Internet: https://www.bilibili.com/video/av13077447.
(Continued)

*Primary Examiner* — Michael A Cuff
(74) *Attorney, Agent, or Firm* — Morgan, Lewis & Bockius LLP

(57) ABSTRACT

This application discloses an information synchronization method performed at a server. The method includes: identifying a virtual scene of a game currently running at the server, the virtual scene including a virtual object, a first object and a second object within a field of view of a virtual object; obtaining first attribute information of the first object and second attribute information of the second object, in response to detecting a change of attribute information of the first object and the second object; determining a first distance between the virtual object and the first object and a second distance between the virtual object and the second object; and synchronizing the first attribute information and the second attribute information with a terminal corresponding to the virtual object based on the first distance between the virtual object and the first object and the second distance between the virtual object and the second object.

20 Claims, 8 Drawing Sheets

(58) Field of Classification Search
USPC .......................................................... 463/43
See application file for complete search history.

(56) References Cited

U.S. PATENT DOCUMENTS

| | | | |
|---|---|---|---|
| 10,668,372 B2* | 6/2020 | Yokoyama | A63F 13/213 |
| 2017/0153864 A1* | 6/2017 | Zhou | G06T 19/006 |
| 2018/0035097 A1* | 2/2018 | Ohishi | G06T 7/194 |
| 2018/0176730 A1 | 6/2018 | Szymczyk et al. | |
| 2020/0183157 A1* | 6/2020 | Suzuki | B60R 11/0229 |

FOREIGN PATENT DOCUMENTS

| | | |
|---|---|---|
| CN | 105117296 A | 12/2015 |
| CN | 105935494 A | 9/2016 |
| CN | 106023289 A | 10/2016 |
| CN | 107911374 A | 4/2018 |
| CN | 108446014 A | 8/2018 |
| CN | 109364478 A | 2/2019 |

OTHER PUBLICATIONS

"[World of Warships] 24W Injury Single-Field Radio Radar Liu Yueyang (Nearly 3000 Naked Experience)", Sep. 6, 2018, retrieved from the Internet: https://www.bilibili.com/video/BV1UW411Z7UQ.
Tencent Technology, ISR, PCT/CN2019/099916, Nov. 1, 2019, 2 pgs.
Tencent Technology, WO, PCT/CN2019/099916, Nov. 1, 2019, 4 pgs.
Tencent Technology, IPRP, PCT/CN2019/099916, Mar. 9, 2021, 5 pgs.

\* cited by examiner

INFORMATION SYNCHRONIZATION METHOD AND APPARATUS, AND STORAGE MEDIUM

CROSS REFERENCE TO RELATED APPLICATIONS

This application is a continuation application of PCT Patent Application No. PCT/CN2019/099916, entitled "INFORMATION SYNCHRONIZATION METHOD, DEVICE, AND STORAGE MEDIUM" filed on Aug. 9, 2019, which claims priority to Chinese Patent Application No. 201811044015.2, entitled "INFORMATION SYNCHRONIZATION METHOD AND APPARATUS, AND STORAGE MEDIUM" filed on Sep. 7, 2018, all of which are incorporated by reference in their entirety.

FIELD OF THE TECHNOLOGY

This application relates to the field of computers, and specifically, to an information processing technology.

BACKGROUND OF THE DISCLOSURE

Currently, field-of-view management in a game map is generally implemented based on field-of-view units. A huge map is divided into netted field-of-view units, and coordinates mounted in each field-of-view unit belong to objects of the field-of-view units. When an object changes, a field-of-view broadcast mode is generally used for performing object information synchronization: notifying players within a target field of view centered on a field-of-view unit in which the object is located.

However, in some scenes, for example, when a map range expands, if the foregoing notification mode is still used for the field-of-view management, memory usage increases sharply. In this case, it is likely that a memory of a terminal cannot meet requirements of the field-of-view management. Therefore, the object information synchronization mode provided in the related art has the problem that the expansion of a map range leads to a sharp increase in memory usage.

SUMMARY

Embodiments of this application provide an information synchronization method and apparatus, and a storage medium, to resolve at least the technical problem of the information synchronization mode provided in the related art that the expansion of a map range leads to a sharp increase in memory usage.

According to an aspect of the embodiments of this application, an information synchronization method is provided, applied to a server, the method including: identifying a virtual scene of a game currently running at the server, the virtual scene including a virtual object, a first object and a second object, wherein the first object and the second object are within a field of view of a virtual object; obtaining first attribute information of the first object and second attribute information of the second object, in response to detecting a change of attribute information of the first object and the second object; determining a first distance between the virtual object and the first object and a second distance between the virtual object and the second object; and synchronizing the first attribute information and the second attribute information with a terminal corresponding to the virtual object, when the first distance between the virtual object and the first object is within a first attribute synchronization range of the first object and the second distance between the virtual object and the second object is within a second attribute synchronization range of the second object, the first attribute synchronization range of the first object being greater than the second attribute synchronization range of the second object.

According to another aspect of the embodiments of this application, a server includes a processor, a memory coupled to the processor and a plurality of computer programs stored in the memory. The programs, when executed by the processor, cause the server to perform the foregoing information synchronization method.

According to still another aspect of the embodiments of this application, a non-transitory computer readable storage medium is further provided, the non-transitory computer readable storage medium storing a plurality of computer programs in connection with a server having a processor, the computer programs, when executed by the processor, cause the server to perform the foregoing information synchronization method.

In the embodiments of this application, attribute information is synchronized on the objects in the game based on a plurality of attribute synchronization ranges. Current attribute information of a first object is obtained as first attribute information, and current attribute information of a second object is obtained as second attribute information, in response to detecting that attribute information of the first object and attribute information of the second object change in a currently running game, the first object and the second object being within a field of view of a virtual object in the game; and the second attribute information and/or the first attribute information are/is synchronized, according to a first distance between the virtual object and the first object and a second distance between the virtual object and the second object, with a client corresponding to the virtual object, a first attribute synchronization range of the first object being greater than a second attribute synchronization range of the second object. Because at least two attribute synchronization ranges are used, and attribute synchronization ranges of different objects may be different, some objects may be selectively displayed during the expansion of the map range, to flexibly adjust the attribute synchronization range, so that the technical effect of reducing memory usage is achieved, and the technical problem of the information synchronization mode provided in the related art that the expansion of a map range leads to a sharp increase in memory usage is resolved.

BRIEF DESCRIPTION OF THE DRAWINGS

The accompanying drawings described herein are used for providing further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make a person skilled in the art better understand solutions of this application, the following clearly and completely describes the technical solutions in embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The terms such as "first" and "second" in the specification, claims, and foregoing accompanying drawings of this application are intended to distinguish between similar objects rather than describe a particular sequence or a chronological order. It is to be understood that the data termed in such a way is interchangeable in proper circumstances, so that the embodiments of this application described herein can be implemented in other orders than the orders illustrated or described herein. Moreover, the terms "include", "contain" and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device.

Figure 1:
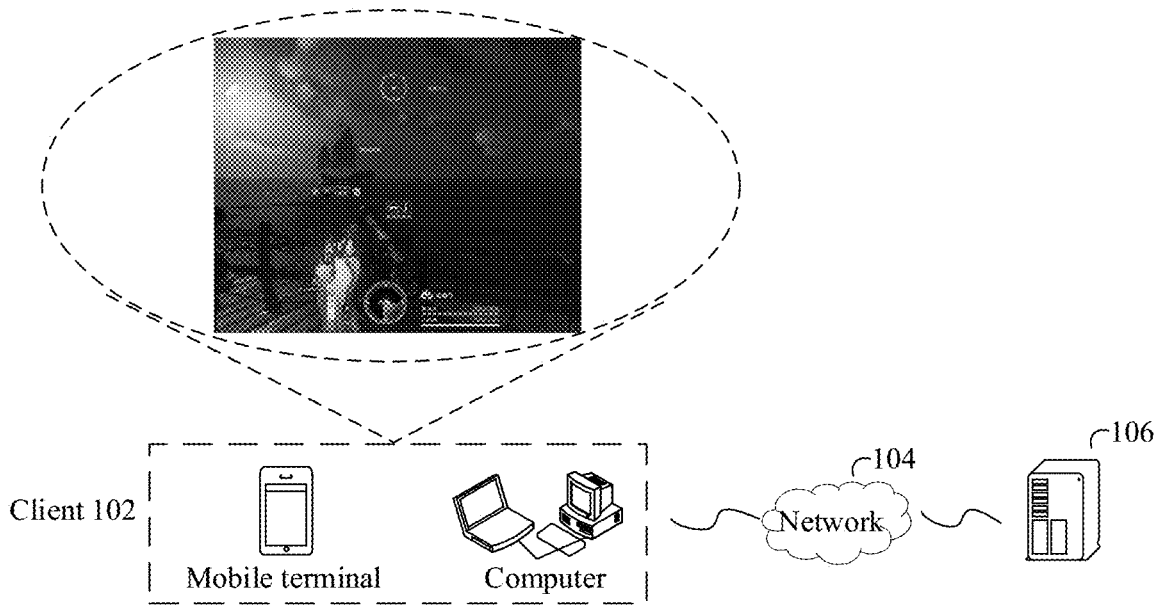
FIG. 1 is a schematic diagram of an application environment of an information synchronization method according to an embodiment of this application.

According to an aspect of the embodiments of this application, an information synchronization method is provided. Optionally, the information synchronization method may be, but is not limited to being applied to an application environment shown in FIG. 1. As shown in FIG. 1, a client 102 running in a terminal corresponds to a virtual object in a currently running game, and the client 102 interacts with a server 106 through a network 104. The server 106 obtains current attribute information of a first object as first attribute information, and obtains current attribute information of a second object as second attribute information, in response to detecting that attribute information of the first object and attribute information of the second object change in a currently running game, the first object and the second object being within a field of view of a virtual object in the game; and synchronizes the second attribute information and/or the first attribute information with the client 102 according to a first distance between the virtual object and the first object and a second distance between the virtual object and the second object, a first attribute synchronization range of the first object being greater than a second attribute synchronization range of the second object. In response to attribute synchronization information transmitted from the server 106, the client 102 displays the first object having the first attribute information and/or the second object having the second attribute information on the client 102.

Optionally, in this embodiment, the terminal may include, but is not limited to, at least one of the following: a mobile phone, a tablet computer, a personal computer (PC), and the like. The network 104 may include, but is not limited to, a wireless network or a wired network. The wireless network includes: Bluetooth, Wi-Fi, and another network implementing wireless communication, and the wired network includes: a local area network, a metropolitan area network, and a wide area network. The server 106 may include, but is not limited to, at least one of the following: a PC and another device for providing a game service. The foregoing is merely an example, and is not limited in this embodiment.

Figure 2:
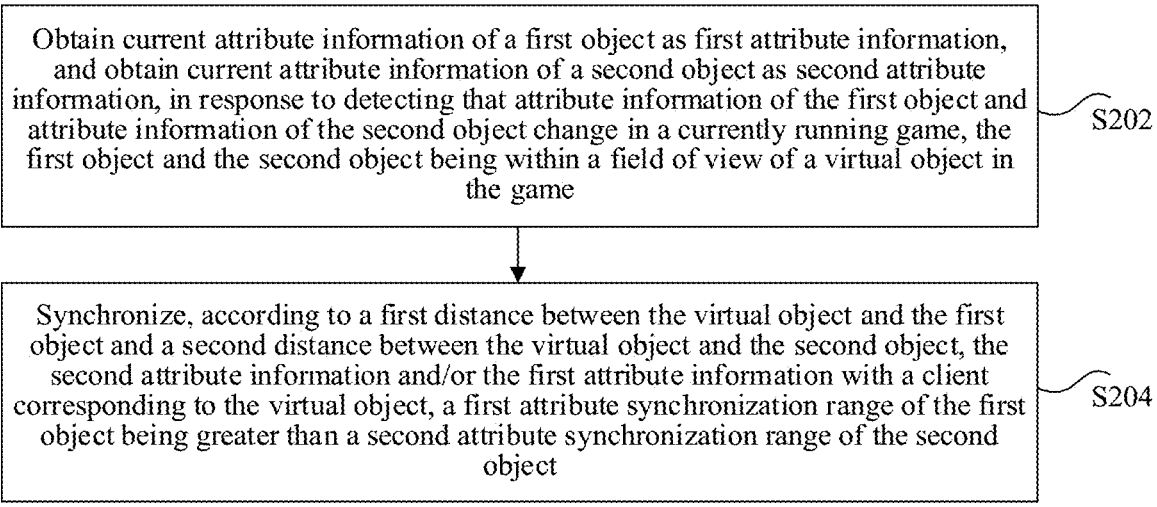
FIG. 2 is a schematic flowchart of an optional information synchronization method according to an embodiment of this application.

Optionally, in this embodiment, in an optional implementation, as shown in FIG. 2, the foregoing information synchronization method applied to a server side may include the following steps:

S202. Obtain current attribute information of a first object as first attribute information, and obtain current attribute information of a second object as second attribute information, in response to detecting that attribute information of the first object and attribute information of the second object change in a currently running game, the first object and the second object being within a field of view of a virtual object in the game. In some embodiments, the server first identifies a virtual scene of the game currently running at the server and the virtual scene includes the virtual object and the first and second objects such that both the first object and the second object are within a field of view of the virtual object. Next, in response to detecting a change of attribute information of the first object and the second object, the server obtains first attribute information of the first object and second attribute information of the second object.

S204. Synchronize, according to a first distance between the virtual object and the first object and a second distance between the virtual object and the second object, the second attribute information and/or the first attribute information with a client (i.e., a terminal) corresponding to the virtual object, a first attribute synchronization range of the first object being greater than a second attribute synchronization range of the second object. For example, the server determines a first distance between the virtual object and the first object and a second distance between the virtual object and the second object and synchronizes the first attribute information and the second attribute information with the terminal running the game, when the first distance between the virtual object and the first object is within a first attribute synchronization range of the first object and the second distance between the virtual object and the second object is within a second attribute synchronization range of the second object. In some embodiments, the first attribute synchronization range of the first object is greater than the second attribute synchronization range of the second object.

Optionally, the information synchronization method may be applied to a game application, or a virtual shopping application, or a virtual visiting application, or a simulation training application. The game application may be a multi-player online battle arena (MOBA) game or a single-player game (SPG). No specific limitation is imposed herein. The game application may include, but is not limited to, at least one of the following: a two-dimensional (2D for short) game application, a three-dimensional (3D for short) game application, a virtual reality (VR for short) game application, an augmented reality (AR for short) game application, and a mixed reality (MR for short) game application. The foregoing is merely an example, and is not limited in this embodiment. A virtual world in the game application may be a world developed or formed using a computer technology, an Internet technology, a satellite technology, and consciousness potential of humans. The virtual world may be independent of a real world, or may be in specific contact with a real world, and people can control or enter the virtual world by specific means.

The foregoing steps S202 to S204 may be performed by a server. The server may be configured to provide a game data service.

In step S202, it is detected in a currently running game that attribute information of a first object changes to first attribute information, and attribute information of a second object changes to second attribute information, the first object and the second object being within a field of view of a virtual object in the game.

In a scene of one game, a plurality of different objects may exist simultaneously, and the server may detect changes of attribute information of the objects in the scene. The objects may be objects whose attribute information may change with time, for example, players, monsters, and boats. The changes of the attribute information of the objects may include, but are not limited to, changes of the following content:

1) health points and magic points of an object;

2) operations executed by an object, such as issuing an ability, and a location change, where the ability may be real-time, for example, an instant ability, or may be non-real-time, for example, an ability issued periodically (for example, triggered at a predetermined time after an ability is issued), or an ability triggered conditionally (for example, the ability is a grenade, triggered by non-object other objects by touching), and the position change may be triggered by the object by performing operations such as moving forward, moving backward, and rolling; and 3) passive attribute changes of the object, for example, changes of health points and magic points, an equipment change (equipment breakage, equipment drop, or the like), and a location change, under attack.

Figure 3:
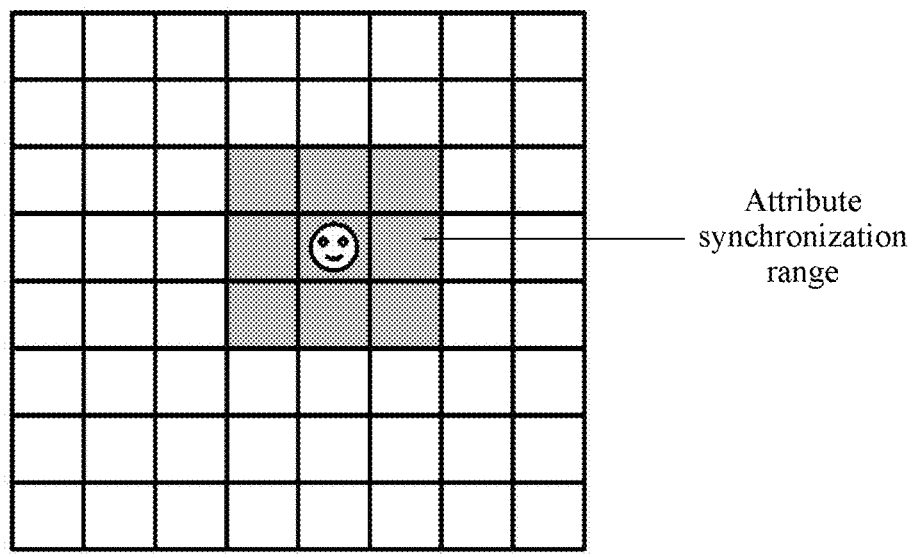
FIG. 3 is a schematic diagram of an optional attribute synchronization range of an object according to an embodiment of this application.

Field of view refers to an object change synchronization range seen by players in a game, including data synchronization such as people (which may be players or NPCs), monsters, buildings, and drops. Field-of-view management is that a huge map is divided into netted field-of-view units, and coordinates mounted in each field-of-view unit belong to objects of the field-of-view units. One field-of-view management unit in a general map in a game may be 64 m*64 m. When players, monsters, or other objects change in the field-of-view unit, the following notification modes may be used, but are not limited:

1) unicast, issued only to players interested in changes;

2) field-of-view broadcast, centered on a field-of-view unit in which the objects are located, to notify peripheral players within a field of view of 9 grids (as shown in FIG. 3); and 3) broadcast. Generally, all players in a single map are notified.

Because focused players are limited in a unicast mode, and a broadcast mode has huge consumption of a CPU and traffic, the field-of-view broadcast is the most common and effective notification mode. This mode divides the map into regions properly, and only players in a limited range are notified when the objects change. This mode takes into account both performance of the game and a limitation to traffic.

Optionally, the field of view of the virtual object may be a range displayed on a client controlling the virtual object, and the field of view is determined by using a position of the virtual object, a visual angle of the virtual object, and a scene of the virtual object. The scene may be a land scene (for example, an island or a city), or may be an ocean scene. Different positions, visual angles, and scenes of the virtual object in a current map of the game cause different fields of view of the virtual object. For example, a field of view of the virtual object on ocean is different from a field of view of the virtual object on land, and a field of view corresponding to a head-down visual angle of the virtual object is different from a field of view corresponding to a head-up visual angle of the virtual object.

Optionally, objects in the same position within the field of view of the virtual object may be objects having the same coordinates, or may be objects in the same field-of-view unit. The same field-of-view unit may be used for dividing the huge map, and objects in the same position may be the objects in the same field-of-view unit. Alternatively, different field-of-view units may be used for dividing the huge map. For example, a field-of-view unit corresponding to the first object may be a field-of-view unit that uses a first length unit (for example, 1 km) as a side length, and a field-of-view unit corresponding to the second object may be a field-of-view unit that uses a second length unit (for example, 64 m) as a side length.

The first object and the second object may be in the same position within the field of view of the virtual object. The first object and the second object being in the same position may be as follows: Coordinates of the first object and coordinates of the second object belong to the same field-of-view unit, and the field-of-view unit is obtained through division in the huge map according to the same field-of-view unit length.

An attribute synchronization range of an object may be a target range centered on a position of the object. The position of the object may be coordinates of the object, or a field-of-view unit of the object. The target range may be within a circular range of a predetermined radius centered on the coordinates of the object, or may be a set of field-of-view units (9 grids) at specified locations centered on the field-of-view units of the object. The foregoing is merely an example, and is not limited in this embodiment.

Figure 4:
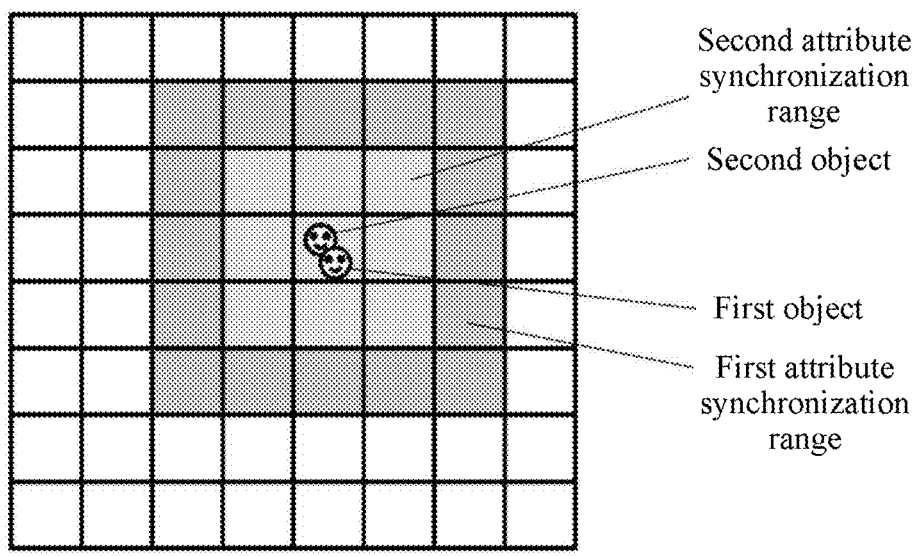
FIG. 4 is a schematic diagram of another optional attribute synchronization range of an object according to an embodiment of this application.
Figure 5:
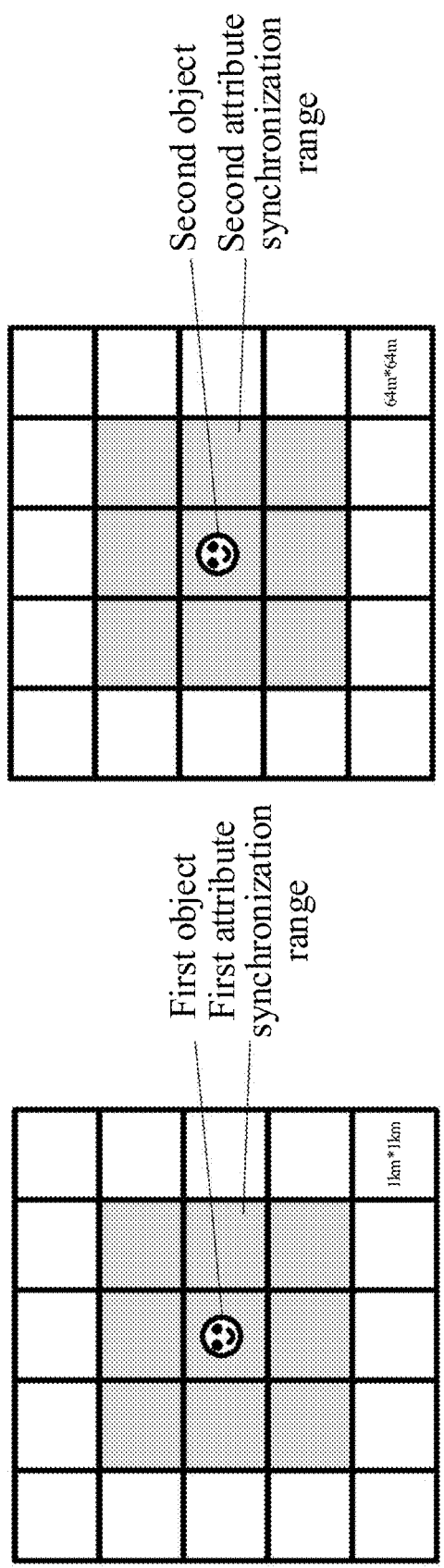
FIG. 5 is a schematic diagram of still another optional attribute synchronization range of an object according to an embodiment of this application.

The attribute synchronization ranges of the first object and the second object may be different, and the difference of the attribute synchronization ranges may be as follows: The length units of the field-of-view units corresponding to the attribute synchronization ranges are the same, but ranges of the synchronized field-of-view units are different. For example, as shown in FIG. 4, the first attribute synchronization range is 25 grids centered on the field-of-view unit in which the first object is located, and the second attribute synchronization range is 9 grids centered on the field-of-view unit in which the second object is located. The difference of the attribute synchronization ranges may be as follows: The length units of the field-of-view units corresponding to the attribute synchronization ranges are different, but the ranges of the synchronized field-of-view units are the same. For example, as shown in FIG. 5, the first attribute synchronization range is 9 grids centered on a first field-of-view unit in which the first object is located, and a side length of the first field-of-view unit is 1 km; and the second attribute synchronization range is 9 grids centered on a second field-of-view unit in which the second object is located, and a side length of the second field-of-view unit is 64 m.

Optionally, for different length units of the field-of-view units, a multi-level field-of-view management mechanism may be used for field-of-view management. The multi-level field-of-view management may be as follows: according division of levels, a multi-level field of view (for example, a two-level field of view) is used. Different field-of-view unit lengths are used for different fields of view, and different objects are mounted on the different levels of field of view. The multi-level field-of-view management mechanism may meet complex performance (for example, an interactive ability, 3D movement, and a boat behavior) of a game and take a hardware processing capability into account.

For example, a two-level field-of-view management mechanism is used for the field-of-view management, and the two-level field of view is referred to as a top-layer field of view and a bottom-layer field of view respectively. The bottom-layer field of view has a relatively small broadcast range (the field-of-view unit has a small length), and is applicable to broadcast behaviors (such as PK among players) such as a relatively low visual distance requirement, a slow movement speed, a complex change of a surrounding environment, and a dense synchronization behavior. However, the top-layer field of view has a large broadcast range, and is applicable to broadcast behaviors (such as ship movement on ocean) such as a high visual distance requirement, a relatively fast movement speed of an object, a simple change of a surrounding environment, and a low-frequency synchronization behavior.

The multi-level field-of-view management mechanism may be used for dividing the game into a plurality of sets of field-of-view management grids (for example, two sets of field-of-view management grids: 64 m field-of-view unit and 1 km field-of-view unit). Each set of field-of-view management grids may correspond to a field-of-view manager (which may be a physical device, or may be a virtual device divided form the field-of-view manager). In this way, the player is in a multi-layer field-of-view manager, and may receive information synchronized by different field-of-view managers.

In different application scenes, the map may be fully covered by a multi-layer field of view, or may be covered by only a single-layer field of view, or may be covered by both a multi-layer field of view and a single-layer field of view.

For example, for two-layer field-of-view management, the top-layer field of view is used when an application scene requires a large-range broadcast, and the bottom-layer field of view (a side length of a field-of-view unit of the top-layer field of view is longer than a side length of a field-of-view unit of the bottom-layer field of view) is switched to when a small-range broadcast is required.

A field-of-view management mode of multi-layer field-of-view full-coverage is not economical (a large quantity of field-of-view data structures need to be allocated according to a size of the field-of-view management unit) in terms of memory usage. A field-of-view management mode of single-layer field-of-view full-coverage, whose object display is incomplete, reduces user experience when refined performance is required. Using a mode in which the multi-layer field-of-view coverage is combined with the single-layer field-of-view coverage can provide a larger field-of-view support, and can ensure user experience when refined performance is required.

Figure 6:
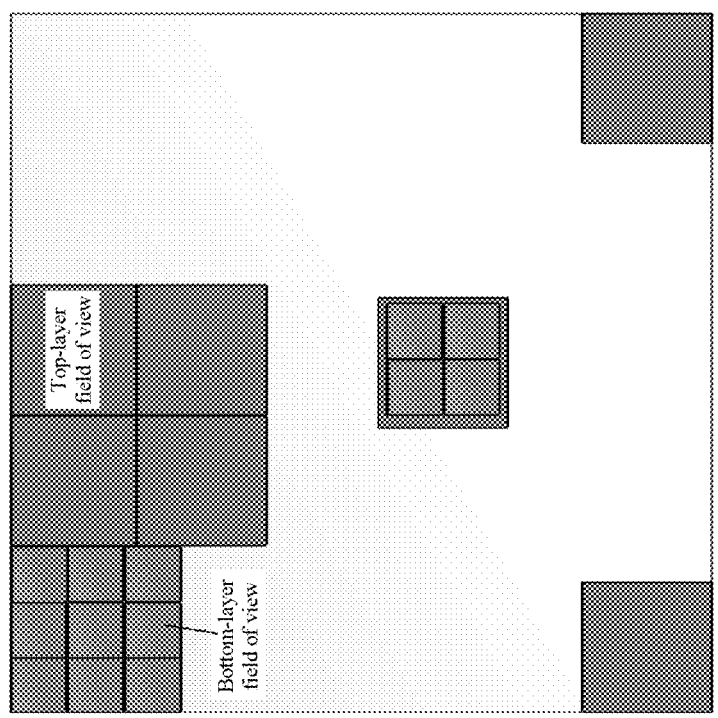
FIG. 6 is a schematic diagram of an optional two-layer field of view of sparse management according to an embodiment of this application.

Optionally, for the two-layer field-of-view management, a self-adaptive field-of-view management mode, for example, a sparse management mode may be used, and is similar to a sparse matrix. The two-layer precision sparse field-of-view management mode may be shown in FIG. 6.

Optionally, both the top-layer field of view and the bottom-layer field of view exist in a suitable scene. In a complete map, the top-layer field of view only exists in an area, the bottom-layer field of view only exists in an area, and a part of which two-layer fields of view coexist exists. For example, a general map only has behaviors of players and monsters, and has a small synchronization range and dense behaviors, and therefore, only needs the existence of a single-layer field of view (the bottom-layer field of view). In a map including an ocean (for example, a navigation map), the ocean has a broad field of view, and a broadcast range of the top-layer field of view is required. However, in an island, visible behaviors between players requires support of the bottom-layer field of view, while the players on the island still intend to see distant boats, and therefore, an area in which the island is located may have the two-layer fields of view.

The sparsity of a field of view on map management mainly depends on terrain requirements. Because the bottom-layer field of view has a relatively small field-of-view management range, in the map of the same size, the bottom-layer field of view consumes more memory than the top-layer field of view. By introducing the sparse management, a management format with high memory consumption can be added only to an island range.

For the field-of-view management mode, a sparse multi-level field of view can be implemented on a code side through an inherited structure. The code may be as follows:

```
//describe last around information in an instance
struct INST_AROUND
{
    u32 x_index;
    u32 y_index;
    AROUND_OBJECT_LIST list_actor;
    AROUND_OBJECT_LIST list_entity;
    AROUND_OBJECT_LIST list_monster;
    AROUND_OBJECT_LIST list_animal;
    AROUND_OBJECT_LIST list_observer;
    AROUND_OBJECT_LIST list_ship;
};
//one INST_AROUND_MANAGER is held in a map instance
    //a plurality of base around mgrs may exist in a super huge map,
and the base around mgrs are allocated according to requirements
    struct INST_AROUND_BASE_MGR
    {
        int around_size;
        int origin_x;    //origin coordinates
        int origin_y;
        int end_x;       //endpoint coordinates
        int end_y;
        u32 around_xnum;    // number around an X direction
        u32 around_ynum;    //number around a Y direction
        INST_AROUND
around_data[AROUND_YMAX_NUM][AROUND_XMAX_NUM];
    };
    struct INST_AROUND_MANAGER : public
    INST_AROUND_BASE_MGR
    {
        INST_AROUND_BASE_MGR*
sub_mgr_data[AROUND_YMAX_NUM][AROUND_XMAX_NUM];
    };
```

INST_AROUND_BASE_MGR is a basic field-of-view management unit, INST_AROUND_MANAGER inherits MAP_AROUND_BASE_MGR as a top-level field-of-view manager, and INST_AROUND_MANAGER itself is a top-level field-of-view management unit. A member object sub_mgr_data thereof serves as a pointer of a bottom-level field-of-view manager. If the area also has the bottom-layer field of view, a manager of the bottom-layer field of view may be quickly indexed by using the pointer, to access bottom-layer field-of-view data, and issue the bottom-layer field-of-view data to objects that need to be broadcasted; or, if the pointer is empty, the object at this level does not need to be broadcasted.

Optionally, in a service, a flexible mode may be used for handling the multi-level field of view, instead of binding the objects to a specific level of view, and is selected as requirements.

For example, behaviors of a person on a boat around an island are broadcasted to the bottom-layer field of view, to allow players near the island to observe, and are also broadcasted to the top-layer field of view, so that boats on a farther ocean surface know a situation of the player. The top-layer field of view and the bottom-layer field of view may independently select interfaces (broadcast according to requirements, broadcast at a specified level, and self-adaption, where the self-adaption selects an appropriate synchronization policy according to a field-of-view level existing in current coordinates) according to service requirements, and flexibility is achieved.

Step S204. Synchronize, according to a first distance between the virtual object and the first object and a second distance between the virtual object and the second object, the second attribute information and/or the first attribute information with a client corresponding to the virtual object, a first attribute synchronization range of the first object being greater than a second attribute synchronization range of the second object.

The first attribute synchronization range of the first object being greater than the second attribute synchronization range of the second object means that: A range (for example, 3 km*3 km) corresponding to a field-of-view unit occupied by the attribute synchronization range of the first object is greater than a range (for example, 192 m*192 m) corresponding to a field-of-view unit occupied by the attribute synchronization range of the second object.

Optionally, the synchronizing, according to a first distance between the virtual object and the first object and a second distance between the virtual object and the second object, the first attribute information and/or the second attribute information with a client corresponding to the virtual object may include: synchronizing the first attribute information with the client in a case that the virtual object is in the first attribute synchronization range of the first object; and/or, synchronizing the second attribute information with the client in a case that the virtual object is in the second attribute synchronization range of the second object.

Whether the virtual object is in the first attribute synchronization range of the first object may be determined according to the first distance between the virtual object and the first object. Whether the virtual object is in the second attribute synchronization range of the second object may be determined according to the second distance between the virtual object and the second object. The following several cases may be included:

(1) When the virtual object is within the first attribute synchronization range of the first object and out of the second attribute synchronization range of the second object, in this case, only the first attribute information is synchronized with the client. In this case, only the first object having the first attribute information is updated and displayed on the client.

(2) When the virtual object is within the first attribute synchronization range of the first object and within the second attribute synchronization range of the second object, in this case, the first attribute information and the second attribute information are simultaneously synchronized with the client. In this case, the first object having the first attribute information and the second object having the second attribute information are simultaneously updated and displayed on the client.

(3) When the virtual object is out of the first attribute synchronization range of the first object and within the second attribute synchronization range of the second object, in this case, only the second attribute information is synchronized with the client. In this case, only the second object having the second attribute information is updated and displayed on the client.

(4) When the virtual object is out of the first attribute synchronization range of the first object and out of the second attribute synchronization range of the second object, neither of the first attribute information and the second attribute information is synchronized with the client. In this case, neither of the first object and the second object is updated and displayed on the client.

Through the foregoing manner, the expression form of the field of view of the players is enriched, and the traffic pressure is taken into account.

At different moments, a relative position between the virtual object and the first object (or the second object) changes. The change of the relative position between the virtual object and the first object (or the second object) may be caused by movement of the virtual object, movement of the first object (or the second object), or simultaneous movement of the virtual object and the first object (or the second object). A movement range may be one or more field-of-view units. Different locations mean that the attribute information synchronized with the client may be different.

For example, at a first moment, if it is detected that the virtual object is within the first attribute synchronization range of the first object (or the second attribute synchronization range of the second object), the attribute information of the first object (or the attribute information of the second object) is synchronized with the client, for the client to display. At a second moment, if it is detected that the virtual object changes from being within the first attribute synchronization range of the first object (or the second attribute synchronization range of the second object) to being out of the first attribute synchronization range of the first object (or the second attribute synchronization range of the second object), a notification message used for removing the first object (or the second object) is transmitted to the client, to instruct the client to remove the displayed first object (or the displayed second object).

The removal operation may be removing the first object (or the second object) from an object linked list corresponding to the virtual object. The object linked list is used for storing object information displayed on the client corresponding to the virtual object. When the object linked list is synchronized with the client, the first object (or the second object) is removed from the client (the first object or the second object is not displayed on the client).

In another example, at a first moment, if it is detected that the virtual object is out of the first attribute synchronization range of the first object (or the second attribute synchronization range of the second object), the attribute information of the first object (or the attribute information of the second object) is not synchronized with the client. At a second moment, if it is detected that the virtual object changes from being out of the first attribute synchronization range of the first object (or the second attribute synchronization range of the second object) to being within the first attribute synchronization range of the first object (or the second attribute synchronization range of the second object), the attribute information of the first object (or the attribute information of the second object) is synchronized with the client, for the client to display.

Figure 7:
FIG. 7 is a schematic diagram of an optional field of view of a virtual object according to an embodiment of this application.

For example, as shown in FIG. 7 (FIG. 7 shows a part of a game interface displayed by the client), different objects such as players and boats, are limited to different field-of-view broadcast ranges. A relatively small field-of-view synchronization range (acting as the foregoing attribute synchronization range, for example, 192 m*192 m) is used for objects such as players, monsters, and items (acting as the second object). A relatively large field-of-view synchronization range (for example, 3 km*3 km) is used for boats (acting as the first object). The player may see that the boat is traveling from a distant place, and may also see that remote boats fire cannons to each other. The players cannot see crew behaviors on the boats. The players can see nearby crew behaviors only after the boats get closer.

Optionally, an attribute synchronization range of the second object may be adjusted from the second attribute synchronization range to a third attribute synchronization range. In a case that the virtual object is within the third attribute synchronization range of the second object, the current attribute information of the second object is obtained as fourth attribute information of the second object, and the fourth attribute information of the second object is synchronized with a client logged in to by a login account.

The third attribute synchronization range and the second attribute synchronization range may be the same or different. In combination with different field-of-view managers, the attribute information of the second object may be broadcasted through different field-of-view managers. For example, the field-of-view manager may be a field-of-view manager in which the first object is located, or may be a field-of-view manager different from both a field-of-view manager in which the first object is located and a field-of-view manager in which a second object is located, or may be a field-of-view manager in which the first object is located and a field-of-view manager in which the second object is located.

The field-of-view manager may independently select interfaces (broadcast according to requirements, broadcast at a specified level, and self-adaption, where the self-adaption selects an appropriate synchronization policy according to a field-of-view level existing in current coordinates) according to service requirements, and flexibility is achieved.

Optionally, the adjusting the attribute synchronization range of the second object from the second attribute synchronization range to the third attribute synchronization range may include: adjusting the attribute synchronization range of the second object from the second attribute synchronization range to the third attribute synchronization range in response to detecting that the virtual object completes a target task in the game.

Optionally, the target task that triggers a switch of the attribute synchronization range of the object may be set. For example, the virtual object performs an operation (for example, transmits a view request to the server) of viewing all objects in the field-of-view unit in which the second object is located, or the virtual object initiates an attack on the object (for example, the first object) in the field-of-view unit in which the second object is located.

After the field of view of the virtual object changes (switches from the first field of view to the second field of view), the attribute information of the target object (the virtual object covered by the attribute synchronization range in the game) may be synchronized with the client corresponding to the virtual object.

When the field of view of the virtual object changes, the object information in the field of view of the virtual object changes accordingly, and the attribute information of the target object may be synchronized with the client by obtaining the attribute information of the virtual object covered by the attribute synchronization range in the game, so as to update the object displayed in the client in time.

The change of the field of view may be a position change of the virtual object (for example, triggered by the virtual object entering a new field-of-view unit), or may be triggered by a change of a visual angle of the virtual object.

Optionally, first object attribute information synchronized with an object in the first field-of-view manager is obtained by using a target pointer in a case that the virtual object is in a first area in which a first field-of-view manager and a second field-of-view manager coexist, the first object being located in the first field-of-view manager, and an attribute synchronization range of the object in the first field-of-view manager being the first attribute synchronization range; and the second field-of-view manager is indexed to by using the target pointer, and second object attribute information synchronized with an object in the second field-of-view manager is obtained, the second object being located in the second field-of-view manager, and an attribute synchronization range of the object in the second field-of-view manager being the second attribute synchronization range.

In the embodiments of this application, attribute information is synchronized on the objects in the game based on a plurality of attribute synchronization ranges. Current attribute information of a first object is obtained as first attribute information, and current attribute information of a second object is obtained as second attribute information, in response to detecting that attribute information of the first object and attribute information of the second object change in a currently running game, the first object and the second object being within a field of view of a virtual object in the game; and the second attribute information and/or the first attribute information are/is synchronized, according to a first distance between the virtual object and the first object and a second distance between the virtual object and the second object, with a client corresponding to the virtual object, a first attribute synchronization range of the first object being greater than a second attribute synchronization range of the second object. In this way, the attribute synchronization range can be flexibly adjusted, and the memory usage is reduced. In an optional implementation, after the synchronizing, according to a first distance between the virtual object and the first object and a second distance between the virtual object and the second object, the first attribute information and/or the second attribute information with a client corresponding to the virtual object, the method further includes:

transmitting, in response to detecting that the virtual object moves out of the second attribute synchronization range of the second object, a notification message used for removing the second object to the client.

In this embodiment, in response to detecting that the virtual object moves from being within the second attribute synchronization range of the second object to being out of the second attribute synchronization range of the second object, the second object is removed from the client corresponding to the virtual object, so that object information within the field of view can be accurately synchronized on the client, and user experience is improved.

In an optional implementation, after the synchronizing, according to a first distance between the virtual object and the first object and a second distance between the virtual object and the second object, the first attribute information and/or the second attribute information with a client corresponding to the virtual object, the method further includes:

obtaining the current attribute information of the second object as third attribute information of the second object in response to detecting that the virtual object moves to the second attribute synchronization range of the second object, and synchronizing the third attribute information of the second object with the client.

According to the embodiment, in response to detecting that the virtual object moves from being out of the second attribute synchronization range of the second object to being within the second attribute synchronization range of the second object, the current attribute information of the second object is obtained as the third attribute information of the second object, and the third attribute information is synchronized with the client corresponding to the virtual object. Therefore, the object information of the virtual object covered by the attribute synchronization range can be displayed on the client in time, and user experience is improved.

In an optional implementation, after the synchronizing, according to a first distance between the virtual object and the first object and a second distance between the virtual object and the second object, the first attribute information and/or the second attribute information with a client corresponding to the virtual object, the method further includes the following steps:

S1. Adjust an attribute synchronization range of the second object from the second attribute synchronization range to a third attribute synchronization range, the third attribute synchronization range being greater than the second attribute synchronization range.

S2. Obtain the current attribute information of the second object as fourth attribute information of the second object in a case that the virtual object is within the third attribute synchronization range of the second object, and synchronize the fourth attribute information of the second object with the client.

Optionally, the adjusting an attribute synchronization range of the second object from the second attribute synchronization range to a third attribute synchronization range includes:

adjusting the attribute synchronization range of the second object from the second attribute synchronization range to the third attribute synchronization range in response to detecting that the virtual object completes a target task in the game.

In this embodiment, adjusting the attribute synchronization range of the object to display the object on the client can enrich a display form of the game scene, and improve user experience.

In an optional implementation, after the synchronizing, according to a first distance between the virtual object and the first object and a second distance between the virtual object and the second object, the first attribute information and/or the second attribute information with a client corresponding to the virtual object, the method further includes the following steps:

S1. Obtain, by using a target pointer in a case that the virtual object is in a first area in which a first field-of-view manager and a second field-of-view manager coexist, first object attribute information synchronized with an object in the first field-of-view manager, the first object being located in the first field-of-view manager, and an attribute synchronization range of the object in the first field-of-view manager being the first attribute synchronization range.

S2. Index to the second field-of-view manager by using the target pointer, and obtain second object attribute information synchronized with an object in the second field-of-view manager, the second object being located in the second field-of-view manager, and an attribute synchronization range of the object in the second field-of-view manager being the second attribute synchronization range.

In this embodiment, a switch is performed between the field-of-view managers corresponding to different attribute synchronization ranges by using the target pointer, to separately obtain object attribute information synchronized with the objects in different field-of-view managers, so that management of the objects with different attributes and different ranges can be facilitated.

In an optional implementation, the synchronizing, according to a first distance between the virtual object and the first object and a second distance between the virtual object and the second object, the first attribute information and/or the second attribute information with a client corresponding to the virtual object includes the following steps:

S1. Synchronize the first attribute information with the client in a case that the virtual object is in the first attribute synchronization range of the first object.

S2. Synchronize the second attribute information with the client in a case that the virtual object is in the second attribute synchronization range of the second object.

In this embodiment, according to a relationship between the virtual object and attribute synchronization ranges of different objects, the attribute information of different objects is synchronized, to implement the synchronization of the attribute information of different objects.

Figure 8:
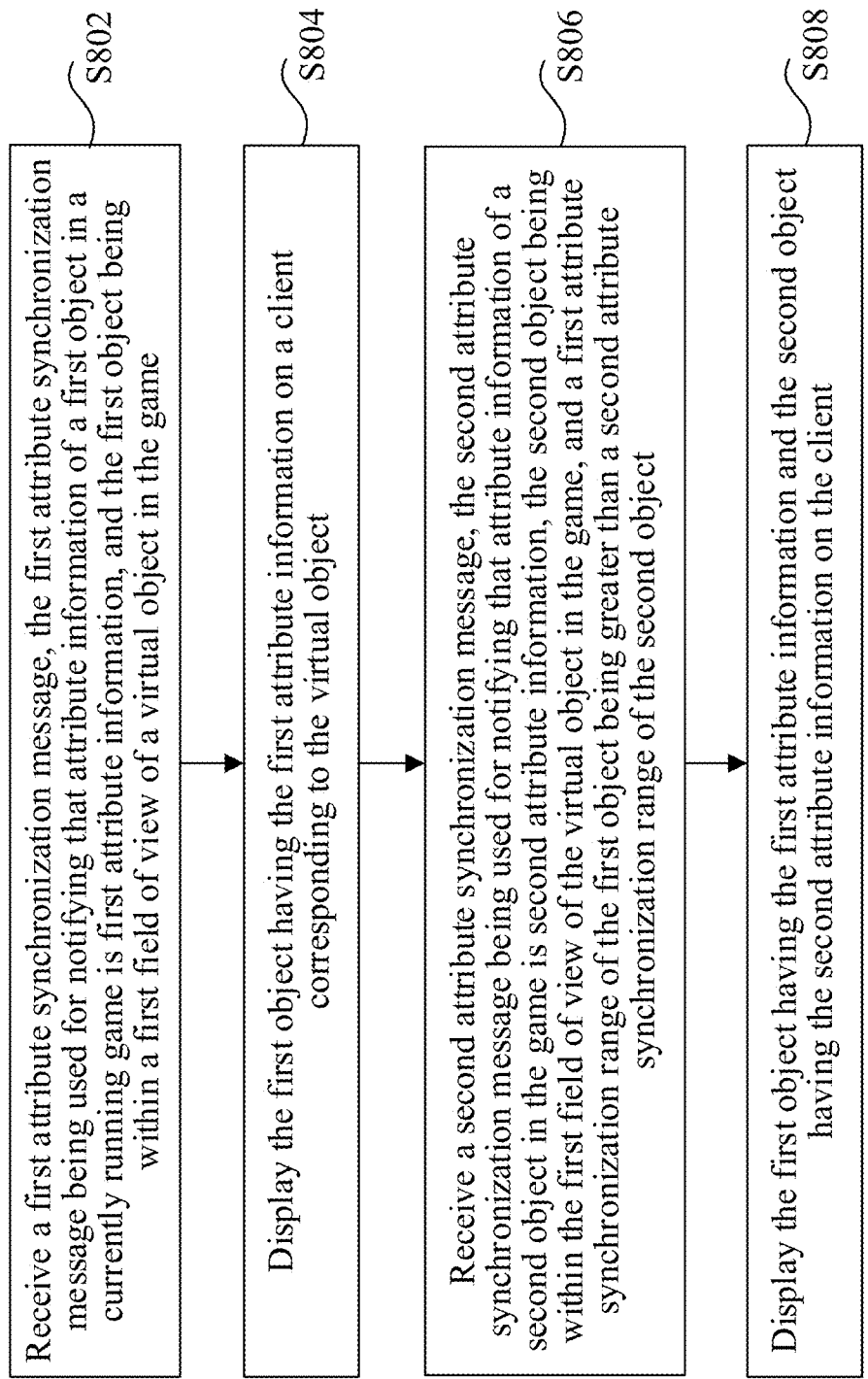
FIG. 8 is a schematic flowchart of another optional information synchronization method according to an embodiment of this application.

In this embodiment, in another optional implementation, as shown in FIG. 8, the foregoing information synchronization method applied to a terminal side may include the following steps:

S802. Receive a first attribute synchronization message, the first attribute synchronization message being used for notifying that attribute information of a first object in a currently running game is first attribute information, and the first object being within a first field of view of a virtual object in the game.

S804. Display the first object having the first attribute information on a client corresponding to the virtual object.

S806. Receive a second attribute synchronization message, the second attribute synchronization message being used for notifying that attribute information of a second object in the game is second attribute information, the second object being within the first field of view of the virtual object in the game, and a first attribute synchronization range of the first object being greater than a second attribute synchronization range of the second object.

S808. Display the first object having the first attribute information and the second object having the second attribute information on the client.

Optionally, the information synchronization method may be applied to the game application, or the virtual shopping application, or the virtual visiting application, or the simulation training application described above.

In step S802, a first attribute synchronization message is received, the first attribute synchronization message being used for notifying that attribute information of a first object in a currently running game is first attribute information, and the first object being within a first field of view of a virtual object in the game.

In a game scene, a plurality of different objects may exist in the field of view of the virtual object simultaneously. When the attribute information of the object changes, the client may be notified by using the following notification modes: unicast, field-of-view broadcast, and broadcast, which are not limited.

The attribute synchronization ranges of different objects are different, and the first attribute synchronization range of the first object may be greater than the second attribute synchronization range of the second object. Therefore, the first object and the second object are within the field of view of the virtual object (for example, both are in the same position within the field of view, or from the virtual object by the same quantity of field-of-view units), and relative positions between the virtual object and the first object, and between the virtual object and the second object may change.

The objects in the same position within the field of view of the virtual object may be objects having the same coordinates, or may be objects in the same field-of-view unit. The attribute synchronization ranges of different objects may be the same or different. A field-of-view unit corresponding to the first object may be a field-of-view unit that uses a first length unit (for example, 1 km) as a side length, and a field-of-view unit corresponding to the second object may be a field-of-view unit that uses a second length unit (for example, 64 m) as a side length.

The first attribute synchronization message is received by the client corresponding to the virtual object, and the first attribute synchronization message is used for notifying that the current attribute information of the first object is first attribute information. The first attribute synchronization message may be triggered and generated by a change of the attribute information of the first object, or may be triggered and generated by the virtual object entering the first attribute synchronization range of the first object.

In step S804, the first object having the first attribute information is displayed on the client corresponding to the virtual object.

After the first attribute synchronization message is received, the first object having the first attribute information is displayed, according to the first attribute information, on the client corresponding to the virtual object.

For example, after relative movement between the boat and the player causes the player to enter a field-of-view synchronization range of the boat, or when the player is within a field-of-view synchronization range of the boat, and current attribute information of the boat changes, the current attribute information of the boat is synchronized with a client corresponding to the player, and after the current attribute information of the boat is received, a boat having the attribute information within the field of view of the player is updated and displayed.

After the first object having the first attribute information is displayed on the client corresponding to the virtual object, the attribute synchronization range of the second object may be adjusted from the second attribute synchronization range to a third attribute synchronization range. The third attribute synchronization range may be greater than the second attribute synchronization range, or may be less than the second attribute synchronization range.

The adjustment operation may be automatically adjusting according to a synchronization policy. The synchronization policy may be as follows: in response to detecting that the virtual object completes the target task in the game, the attribute synchronization range of the second object is adjusted from the second attribute synchronization range to the third attribute synchronization range, or when the second object is in a target scene (for example, an island or a coast), the attribute synchronization range of the second object is adjusted from the second attribute synchronization range to the third attribute synchronization range, or after a target instruction (triggered by a user or automatically triggered by a system) is received, the attribute synchronization range of the second object is adjusted from the second attribute synchronization range to the third attribute synchronization range. The specific adjustment mode may be set according to requirements, and is not limited in this embodiment.

Optionally, after the first object having the first attribute information is displayed on the client corresponding to the virtual object, it is detected that the virtual object completes the target task in the game, the target task being used for triggering to adjust the attribute synchronization range of the second object from the second attribute synchronization range to the third attribute synchronization range.

The target task may be that: The virtual object performs an operation (for example, transmits a view request to the server) of viewing all objects in the field-of-view unit in which the second object is located, or the virtual object initiates an attack on the object (for example, the first object) in the field-of-view unit in which the second object is located.

Optionally, after it is detected that the virtual object completes the target task in the game, a third attribute synchronization message may be received. The third attribute synchronization message is used for notifying that the current attribute information of the second object is the third attribute information, and the second object having the third attribute information is displayed on the client.

After the attribute synchronization range of the second object is adjusted from the second attribute synchronization range to the third attribute synchronization range, the virtual object may be located within the third attribute synchronization range of the second object. The server may synchronize the current attribute information (the third attribute information) of the second object with the client corresponding to the virtual object. After the client receives the current attribute information of the second object (for example, in a manner of the attribute synchronization message), the second object having the attribute information is displayed on the client.

For example, after the player on the boat enters the target scene (for example, an island), the field-of-view synchronization range of the player is adjusted to be the same as the field-of-view synchronization range of the boat, so that boats on a farther ocean surface know a situation of the player.

Step S806. Receive a second attribute synchronization message, the second attribute synchronization message being used for notifying that current attribute information of a second object in the game is second attribute information, the second object being within the first field of view of the virtual object in the game, and a first attribute synchronization range of the first object being greater than a second attribute synchronization range of the second object.

The second attribute synchronization message is received by the client corresponding to the virtual object, and the second attribute synchronization message is used for notifying that the current attribute information of the second object is second attribute information. The second attribute synchronization message may be triggered by a change of the current attribute information of the second object, or may be triggered by the virtual object entering the second attribute synchronization range of the second object.

The first object and the second object may be in the same position within the field of view of the virtual object. Because in a process that the relative position between the first object and the virtual object and the relative position between the second object and the virtual object change (the first object and the second object approach the virtual object), the first attribute synchronization range of the first object is greater than the second attribute synchronization range of the second object, the virtual object is in the first attribute synchronization range of the first object, and the client corresponding to the virtual object receives the current attribute information of the first object, and displays the first object. When the first object and the second object further approach the virtual object, the virtual object is in the second attribute synchronization range of the second object, and the client corresponding to the virtual object may receive the current attribute information of the second object.

Step S808. Display the first object having the first attribute information and the second object having the second attribute information on the client.

After the second attribute information of the second object is received, the first object having the first attribute information and the second object having the second attribute information may be displayed on the client corresponding to the virtual object, to display different objects at levels.

For example, in a process that the boat in the ocean scene moves only to the player, the player may see that the boat (the first object) is traveling from a distant place, and may also see that remote boats fire cannons to each other. The player can see both the boats and nearby crew (the second object) behaviors after the boats approach.

Optionally, after the first object having the first attribute information and the second object having the second attribute information are displayed on the client, when the virtual object changes from being within the second attribute synchronization range of the second object to being out of the second attribute synchronization range of the second object, a notification message used for removing the second object may be received. The displayed second object is removed from the client in response to the notification message.

After the first object and the second object are displayed on the client, the relative position between the virtual object and the second object changes, and the virtual object may change from being within the second attribute synchronization range of the second object to being out of the second attribute synchronization range of the second object. The client accordingly receives the notification message used for removing the second object. The displayed second object may be removed from the client in response to the notification message.

The second object may be removed from an object linked list corresponding to the virtual object. The object linked list is used for storing the object information displayed on the client corresponding to the virtual object. When the object linked list is synchronized with the client, the second object is accordingly removed from a display interface of the client (the second object is not displayed on the client).

Optionally, during running of the game, a fourth attribute notification message is received in a case that a field of view of the virtual object is switched from the first field of view to a second field of view, the fourth attribute notification message being used for notifying that attribute information of a target object is fourth attribute information, and the target object being an object that is within the second field of view of the virtual object in the game, and that has an attribute synchronization range covering the virtual object; and the target object having the fourth attribute information is displayed on the client in response to the fourth attribute notification message.

When the field of view of the virtual object changes, the object information in the field of view of the virtual object changes accordingly, and the attribute information of the target object may be synchronized with the client by obtaining the attribute information of the target object covered by the attribute synchronization range in the game. The client may update the displayed object in time.

The change of the field of view may be a position change of the virtual object (for example, triggered by the virtual object entering a new field-of-view unit), or may be triggered by a change of a visual angle of the virtual object.

In the embodiments of this application, attribute information is synchronized on the objects in the game based on a plurality of attribute synchronization ranges. A first attribute synchronization message is received, the first attribute synchronization message being used for notifying that attribute information of a first object in a currently running game is first attribute information, and the first object being within a first field of view of a virtual object in the game; the first object having the first attribute information is displayed on a client corresponding to the virtual object; a second attribute synchronization message is received, the second attribute synchronization message being used for notifying that attribute information of a second object in the game is second attribute information, the second object being within the first field of view of the virtual object in the game, and a first attribute synchronization range of the first object being greater than a second attribute synchronization range of the second object; and the first object having the first attribute information and the second object having the second attribute information are displayed on the client. Because at least two attribute synchronization ranges are used, and attribute synchronization ranges of different objects may be different, some objects may be selectively displayed during the expansion of the map range, to achieve the technical effect of reducing the memory usage.

In an optional implementation, after the displaying the first object having the first attribute information on a client corresponding to the virtual object, the method further includes the following steps:

S1. Detect that the virtual object completes a target task in the game, the target task being used for triggering to adjust an attribute synchronization range of the second object from the second attribute synchronization range to a third attribute synchronization range.

Optionally, after the detecting that the virtual object completes a target task in the game, the method further includes the following steps:

S11. Receive a third attribute synchronization message, the third attribute synchronization message being used for notifying that attribute information of the second object is third attribute information.

S12. Display the second object having the third attribute information on the client.

In this embodiment, adjusting the attribute synchronization range of the object to display the object on the client can enrich a display form of the game scene, and improve user experience.

In an optional implementation, after the displaying the first object having the first attribute information and the second object having the second attribute information on the client, the method further includes the following steps:

S1. Receive, in a case that the virtual object moves out of the second attribute synchronization range of the second object, a notification message used for removing the second object.

S2. Remove the displayed second object from the client in response to the notification message.

In this embodiment, in response to detecting that the virtual object changes from being within the second attribute synchronization range of the second object to being out of the second attribute synchronization range of the second object, the second object is removed from the display interface of the client corresponding to the virtual object, so that object information within the field of view can be accurately synchronized on the client, and user experience is improved.

In an optional implementation, after the displaying the first object having the first attribute information and the second object having the second attribute information on the client, the method further includes the following steps:

S1. Receive a fourth attribute notification message in a case that a field of view of the virtual object is switched from the first field of view to a second field of view, the fourth attribute notification message being used for notifying that attribute information of a target object is fourth attribute information, and the target object being an object that is within the second field of view of the virtual object in the game, and that has an attribute synchronization range covering the virtual object.

S2. Display the target object having the fourth attribute information on the client in response to the fourth attribute notification message.

In this embodiment, when the field of view of the virtual object changes, the attribute information of the target object is received and the target object is displayed on the client, so that the object information in the field of view can be accurately synchronized on the client, and user experience is improved.

For ease of description, the foregoing method embodiments are stated as a series of action combinations. However, a person skilled in the art needs to learn that this application is not limited to the sequence of the described actions because according to this application, some steps may use another sequence or may be simultaneously performed. In addition, it is to be understood by a person skilled in the art that the embodiments described in the specification are all exemplary embodiments and the related actions and modules are not mandatory to this application.

Figure 9:
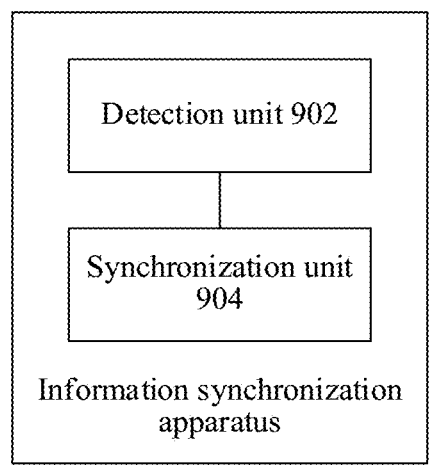
FIG. 9 is a schematic structural diagram of an optional information synchronization apparatus according to an embodiment of this application.

According to another aspect of the embodiments of this application, an information synchronization apparatus is further provided. As shown in FIG. 9, the apparatus includes:

a detection unit 902, configured to: obtain current attribute information of a first object as first attribute information, and obtain current attribute information of a second object as second attribute information, in response to detecting that attribute information of the first object and attribute information of the second object change in a currently running game, the first object and the second object being within a field of view of a virtual object in the game; and a synchronization unit 904, configured to synchronize, according to a first distance between the virtual object and the first object and a second distance between the virtual object and the second object, the first attribute information and/or the second attribute information with a client corresponding to the virtual object, a first attribute synchronization range of the first object being greater than a second attribute synchronization range of the second object.

Optionally, the information synchronization apparatus may be applied to the game application, or the virtual shopping application, or the virtual visiting application, or the simulation training application described above. The detection unit 902 may be configured to perform the foregoing step S202, and the synchronization unit 904 may be configured to perform the foregoing step S204. The information synchronization apparatus may be located in a server, or may be an independent server.

In the embodiments of this application, attribute information is synchronized on the objects in the game based on a plurality of attribute synchronization ranges. Current attribute information of a first object is obtained as first attribute information, and current attribute information of a second object is obtained as second attribute information, in response to detecting that attribute information of the first object and attribute information of the second object change in a currently running game, the first object and the second object being within a field of view of a virtual object in the game; and the second attribute information and/or the first attribute information are/is synchronized, according to a first distance between the virtual object and the first object and a second distance between the virtual object and the second object, with a client corresponding to the virtual object, a first attribute synchronization range of the first object being greater than a second attribute synchronization range of the second object. In this way, the attribute synchronization range can be flexibly adjusted, and the memory usage is reduced.

In an optional implementation, the apparatus further includes:

a first transmission unit, configured to: after the first attribute information and/or the second attribute information are/is synchronized, according to a first distance between the virtual object and the first object and a second distance between the virtual object and the second object, with a client corresponding to the virtual object, transmit, in response to detecting that the virtual object moves out of the second attribute synchronization range of the second object, a notification message used for removing the second object to the client.

In this embodiment, in response to detecting that the virtual object changes from being within the second attribute synchronization range of the second object to being out of the second attribute synchronization range of the second object, the second object is removed from the client corresponding to the virtual object, so that object information within the field of view can be accurately synchronized on the client, and user experience is improved.

In an optional implementation, the apparatus further includes:

a first synchronization unit, configured to: after the first attribute information and/or the second attribute information are/is synchronized, according to a first distance between the virtual object and the first object and a second distance between the virtual object and the second object, with a client corresponding to the virtual object, obtain the current attribute information of the second object as third attribute information of the second object in response to detecting that the virtual object moves to the second attribute synchronization range of the second object, and synchronize the third attribute information of the second object with the client.

In this embodiment, in response to detecting that the virtual object changes from being out of the second attribute synchronization range of the second object to being within the second attribute synchronization range of the second object, the current attribute information of the second object, that is, the third attribute information, is synchronized with the client corresponding to the virtual object, so that the object information of the virtual object covered by the attribute synchronization range can be displayed on the client in time, and user experience is improved.

In an optional implementation, the apparatus further includes:

an adjustment unit, configured to: after the first attribute information and/or the second attribute information are/is synchronized, according to a first distance between the virtual object and the first object and a second distance between the virtual object and the second object, with a client corresponding to the virtual object, adjust the attribute synchronization range of the second object from the second attribute synchronization range to a third attribute synchronization range, the third attribute synchronization range being greater than the second attribute synchronization range; and a second synchronization unit, configured to: obtain the current attribute information of the second object as fourth attribute information of the second object in a case that the virtual object is within the third attribute synchronization range of the second object, and synchronize the fourth attribute information of the second object with the client.

Optionally, the adjustment unit includes:

an adjustment module, configured to adjust the attribute synchronization range of the second object from the second attribute synchronization range to the third attribute synchronization range in response to detecting that the virtual object completes a target task in the game.

In this embodiment, adjusting the attribute synchronization range of the object to display the object on the client can enrich a display form of the game scene, and improve user experience.

In an optional implementation, the apparatus further includes:

a first obtaining unit, configured to: after the first attribute information and/or the second attribute information are/is synchronized, according to a first distance between the virtual object and the first object and a second distance between the virtual object and the second object, with a client corresponding to the virtual object, obtain, by using a target pointer in a case that the virtual object is in a first area in which a first field-of-view manager and a second field-of-view manager coexist, first object attribute information synchronized with an object in the first field-of-view manager, the first object being located in the first field-of-view manager, and an attribute synchronization range of the object in the first field-of-view manager being the first attribute synchronization range; and a second obtaining module, configured to: index to the second field-of-view manager by using the target pointer, and obtain second object attribute information synchronized with an object in the second field-of-view manager, the second object being located in the second field-of-view manager, and an attribute synchronization range of the object in the second field-of-view manager being the second attribute synchronization range.

In this embodiment, a switch is performed between the field-of-view managers corresponding to different attribute synchronization ranges by using the target pointer, to separately obtain object attribute information synchronized with the objects in different field-of-view managers, so that management of the objects with different attributes and different ranges can be facilitated.

In an optional implementation, the synchronization unit 902 includes:

(1) a first synchronization module, configured to synchronize the first attribute information with the client in a case that the virtual object is in the first attribute synchronization range of the first object; and/or (2) a second synchronization module, configured to synchronize the second attribute information with the client in a case that the virtual object is in the second attribute synchronization range of the second object.

In this embodiment, according to a relationship between the virtual object and attribute synchronization ranges of different objects, the attribute information of different objects is synchronized, to implement the synchronization of the attribute information of different objects.

Figure 10:
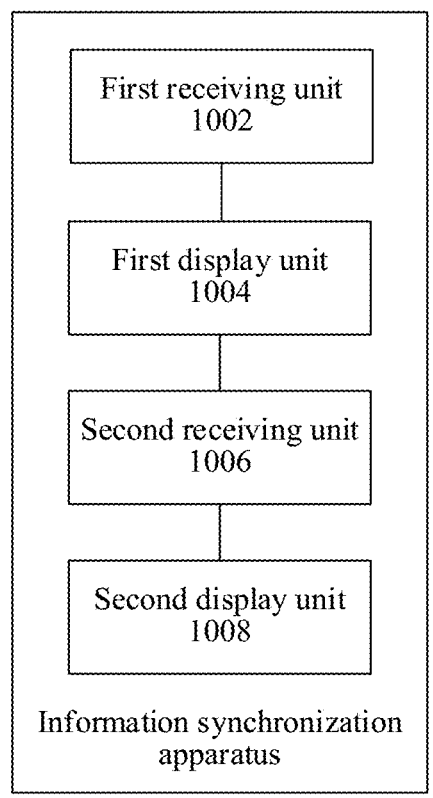
FIG. 10 is a schematic structural diagram of another optional information synchronization apparatus according to an embodiment of this application.

In this embodiment, in another optional implementation, as shown in FIG. 10, the information synchronization apparatus may include:

a first receiving unit 1002, configured to receive a first attribute synchronization message, the first attribute synchronization message being used for notifying that attribute information of a first object in a currently running game is first attribute information, and the first object being within a first field of view of a virtual object in the game;

a first display unit 1004, configured to display the first object having the first attribute information on a client corresponding to the virtual object;

a second receiving unit 1006, configured to receive a second attribute synchronization message, the second attribute synchronization message being used for notifying that attribute information of a second object in the game is second attribute information, the second object being within the first field of view of the virtual object in the game, and a first attribute synchronization range of the first object being greater than a second attribute synchronization range of the second object; and a second display unit 1008, configured to display the first object having the first attribute information and the second object having the second attribute information on the client.

Optionally, the information synchronization method may be applied to the game application, or the virtual shopping application, or the virtual visiting application, or the simulation training application described above. The first receiving unit 1002 may be configured to perform the foregoing step S802, the first display unit 1004 may be configured to perform the foregoing step S804, the second receiving unit 1006 may be configured to perform the foregoing step S806, and the second display unit 1008 may be configured to perform the foregoing step S808. The information synchronization apparatus may be located in a user terminal, or may be an independent user terminal.

In the embodiments of this application, attribute information is synchronized on the objects in the game based on a plurality of attribute synchronization ranges. A first attribute synchronization message is received, the first attribute synchronization message being used for notifying that attribute information of a first object in a currently running game is first attribute information, and the first object being within a first field of view of a virtual object in the game; the first object having the first attribute information is displayed on a client corresponding to the virtual object; a second attribute synchronization message is received, the second attribute synchronization message being used for notifying that attribute information of a second object in the game is second attribute information, the second object being within the first field of view of the virtual object in the game, and a first attribute synchronization range of the first object being greater than a second attribute synchronization range of the second object; and the first object having the first attribute information and the second object having the second attribute information are displayed on the client, so that the attribute synchronization range can be flexibly adjusted, and the memory usage is reduced.

In an optional implementation, the apparatus further includes:

a detection unit, configured to detect that the virtual object completes a target task in the game after the first object having the first attribute information is displayed on the client corresponding to the virtual object, the target task being used for triggering to adjust the attribute synchronization range of the second object from the second attribute synchronization range to the third attribute synchronization range.

Optionally, the apparatus further includes:

(1) a first receiving unit, configured to receive a third attribute synchronization message after it is detected that the virtual object completes a target task in the game, the third attribute synchronization message being used for notifying that attribute information of the second object is third attribute information; and (2) a third display unit, configured to display the second object having the third attribute information on the client.

In this embodiment, adjusting the attribute synchronization range of the object to display the object on the client can enrich a display form of the game scene of the player, and improve user experience.

In an optional implementation, the apparatus further includes:

(1) a second receiving unit, configured to: after the first object having the first attribute information and the second object having the second attribute information are displayed on the client, receive, in a case that the virtual object moves out of the second attribute synchronization range of the second object, a notification message used for removing the second object; and (2) a fourth display unit, configured to remove the displayed second object from the client in response to the notification message.

In this embodiment, in response to detecting that the virtual object changes from being within the second attribute synchronization range of the second object to being out of the second attribute synchronization range of the second object, the second object is removed from the display interface of the client corresponding to the virtual object, so that object information within the field of view can be accurately synchronized on the client, and user experience is improved.

In an optional implementation, the apparatus further includes:

(1) a third receiving unit, configured to: after the first object having the first attribute information and the second object having the second attribute information are displayed on the client, receive a fourth attribute notification message in a case that a field of view of the virtual object is switched from the first field of view to a second field of view, the fourth attribute notification message being used for notifying that attribute information of a target object is fourth attribute information, and the target object being an object that is within the second field of view of the virtual object in the game, and that has an attribute synchronization range covering the virtual object; and (2) a fourth display unit, configured to display the target object having the fourth attribute information on the client in response to the fourth attribute notification message.

In this embodiment, when the field of view of the virtual object changes, the attribute information of the target object is received and the target object is displayed on the client, so that the object information in the field of view can be accurately synchronized on the client, and user experience is improved.

According to still another aspect of the embodiments of this application, a storage medium is further provided. The storage medium stores a computer program, the computer program being configured to perform, when run, steps in any one of the foregoing method embodiments.

Optionally, in this embodiment, the storage medium may be configured to store a computer program used for performing the following steps:

S1. Obtain current attribute information of a first object as first attribute information, and obtain current attribute information of a second object as second attribute information, in response to detecting that attribute information of the first object and attribute information of the second object change in a currently running game, the first object and the second object being within a field of view of a virtual object in the game.

S2. Synchronize, according to a first distance between the virtual object and the first object and a second distance between the virtual object and the second object, the first attribute information and/or the second attribute information with a client corresponding to the virtual object, a first attribute synchronization range of the first object being greater than a second attribute synchronization range of the second object.

Optionally, in this embodiment, the storage medium may be configured to store a computer program for performing the following steps:

S1. Receive a first attribute synchronization message, the first attribute synchronization message being used for notifying that attribute information of a first object in a currently running game is first attribute information, and the first object being within a first field of view of a virtual object in the game.

S2. Display the first object having the first attribute information on a client corresponding to the virtual object.

S3. Receive a second attribute synchronization message, the second attribute synchronization message being used for notifying that attribute information of a second object in the game is second attribute information, the second object being within the first field of view of the virtual object in the game, and a first attribute synchronization range of the first object being greater than a second attribute synchronization range of the second object.

S4. Display the first object having the first attribute information and the second object having the second attribute information on the client.

Optionally, in this embodiment, a person of ordinary skill in the art may understand that all or some of steps of the methods in the foregoing embodiments may be implemented by a program instructing relevant hardware of a terminal device. The program may be stored in a computer-readable storage medium, and the storage medium may include: a flash drive, a read-only memory (ROM for short), a random access memory (RAM for short), a magnetic disk, an optical disc, and the like.

Figure 11:
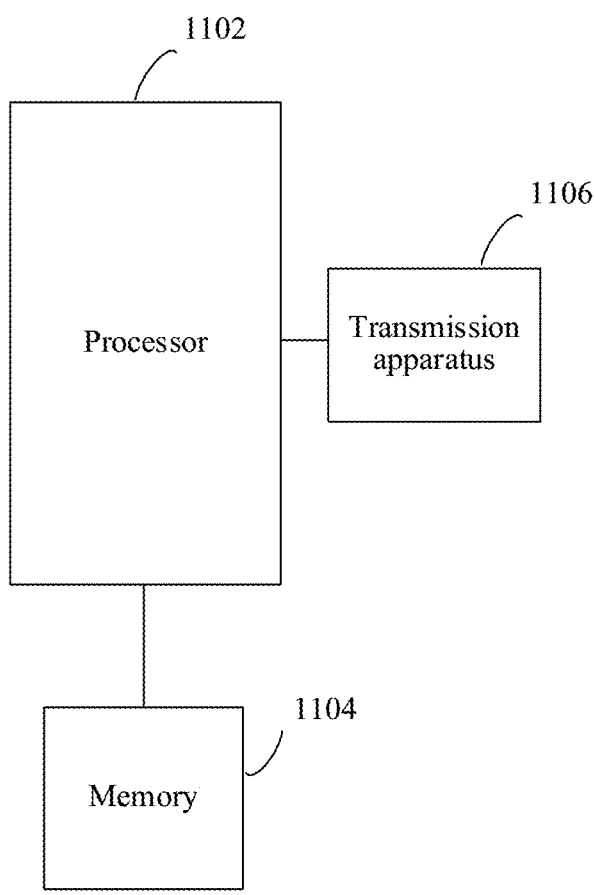
FIG. 11 is a schematic structural diagram of an optional electronic device according to an embodiment of this application.

According to still another aspect of the embodiments of this application, an electronic device configured to perform the foregoing information synchronization method is further provided. As shown in FIG. 11, the electronic device includes a processor 1102, a memory 1104, and a transmission device 1106. The memory 1104 stores a computer program, and the processor 1102 is configured to perform the steps according to any one of the foregoing method embodiments by using the computer program.

Optionally, in this embodiment, the electronic device may be located in at least one of a plurality of network devices in a computer network.

Optionally, in this embodiment, the processor may be configured to perform, by using the computer program, the following steps:

S1. Obtain current attribute information of a first object as first attribute information, and obtain current attribute information of a second object as second attribute information, in response to detecting that attribute information of the first object and attribute information of the second object change in a currently running game, the first object and the second object being within a field of view of a virtual object in the game.

S2. Synchronize, according to a first distance between the virtual object and the first object and a second distance between the virtual object and the second object, the first attribute information and/or the second attribute information with a client corresponding to the virtual object, a first attribute synchronization range of the first object being greater than a second attribute synchronization range of the second object.

Optionally, in this embodiment, the processor may be configured to perform, by using the computer program, the following steps:

S1. Receive a first attribute synchronization message, the first attribute synchronization message being used for notifying that attribute information of a first object in a currently running game is first attribute information, and the first object being within a first field of view of a virtual object in the game.

S2. Display the first object having the first attribute information on a client corresponding to the virtual object.

S3. Receive a second attribute synchronization message, the second attribute synchronization message being used for notifying that attribute information of a second object in the game is second attribute information, the second object being within the first field of view of the virtual object in the game, and a first attribute synchronization range of the first object being greater than a second attribute synchronization range of the second object.

S4. Display the first object having the first attribute information and the second object having the second attribute information on the client.

Optionally, a person of ordinary skill in the art may understand that, the structure shown in FIG. 11 is merely an example. The electronic device may alternatively be a terminal device such as a smartphone (for example, an Android mobile phone or an iOS mobile phone), a tablet computer, a palmtop computer, a mobile Internet device (MID), or a PAD. FIG. 11 does not constitute a limitation on the structure of the electronic device. For example, the electronic device may further include more or fewer components (such as a network interface) than those shown in FIG. 11, or has a configuration different from that shown in FIG. 11.

The memory 1104 may be configured to store a software program and module, for example, a program instruction/module corresponding to the information synchronization method and apparatus in the embodiments of this application, and the processor 1102 runs the software program and module stored in the memory 1104, to perform various functional applications and data processing, that is, implement the foregoing information synchronization method. The memory 1104 may include a high-speed random memory, and may further include a non-volatile memory, for example one or more magnetic storage apparatuses, a flash memory, or another non-volatile solid-state memory. In some embodiments, the memory 1104 may further include memories remotely disposed relative to the processor 1102, and the remote memories may be connected to a terminal through a network. Examples of the foregoing network include, but are not limited to, the Internet, an intranet, a local area network, a mobile communication network and a combination thereof.

Optionally, in this embodiment, the electronic device further includes a transmission apparatus 1106, the transmission apparatus 1106 being configured to receive or transmit data through a network. Specific examples of the network may include a wired network and a wireless network. In an example, the transmission apparatus 1106 includes a network interface controller (NIC) that can be connected to another network device and router by using a cable, to communicate with the Internet or a local area network. In an example, the transmission apparatus 1106 is a radio frequency (RF for short) module, which is configured to communicate with the Internet in a wireless manner.

According to still another aspect of the embodiments of this application, a computer program product including instructions is provided, the instructions, when run on a computer, causing the computer to perform the steps according to any one of the foregoing method embodiments.

The sequence numbers of the foregoing embodiments of this application are merely used for description, and do not imply preference among the embodiments.

When the integrated unit in the foregoing embodiments is implemented in a form of a software function unit and sold or used as an independent product, the integrated unit may be stored in the foregoing computer-readable storage medium. Based on such an understanding, the technical solutions of this application essentially, or a part contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods described in the embodiments of this application.

In the foregoing embodiments of this application, the descriptions of the embodiments have their respective focuses. For a part that is not described in detail in an embodiment, reference may be made to related descriptions in other embodiments.

In the several embodiments provided in this application, the disclosed client may be implemented in another manner. The apparatus embodiment described above is merely an example. For example, the unit division is merely logical function division and may be another division during actual implementation. For example, a plurality of units or components may be combined or integrated into another system, or some features may be ignored or not executed. In addition, the coupling, or direct coupling, or communication connection between the displayed or discussed components may be the indirect coupling or communication connection by means of some interfaces, units, or modules, and may be in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

The foregoing descriptions are merely exemplary implementations of this application. A person of ordinary skill in the art may make several improvements and modifications without departing from the principle of this application, and the improvements and modifications fall within the protection scope of this application.

What is claimed is:

1. An information synchronization method, applied to a server having a processor and a memory storing a plurality of computer programs to be executed by the processor, the method comprising:
   identifying a virtual scene of a game currently running at the server, the virtual scene including a virtual object, a first object and a second object, wherein the first object and the second object are within a field of view of a virtual object;
   obtaining first attribute information of the first object and second attribute information of the second object, in response to detecting a change of attribute information of the first object and the second object;
   determining a first distance between the virtual object and the first object and a second distance between the virtual object and the second object; and
   synchronizing the first attribute information and the second attribute information with a terminal corresponding to the virtual object, when the first distance between the virtual object and the first object is within a first attribute synchronization range of the first object and the second distance between the virtual object and the second object is within a second attribute synchronization range of the second object, the first attribute synchronization range of the first object being greater than the second attribute synchronization range of the second object.

2. The method according to claim 1, further comprising:
   after detecting that the virtual object moves out of the second attribute synchronization range of the second object, transmitting a notification message the terminal for removing the second object from the virtual scene.

3. The method according to claim 1, further comprising:
   after detecting that the virtual object moves into the second attribute synchronization range of the second object:
   obtaining third attribute information of the second object, the third attribute information being different from the second attribute information; and
   synchronizing the third attribute information of the second object with the terminal.

4. The method according to claim 1, further comprising:
   adjusting the second attribute synchronization range of the second object to a third attribute synchronization range, the third attribute synchronization range being greater than the second attribute synchronization range; and
   obtaining fourth attribute information of the second object when the virtual object is within the third attribute synchronization range of the second object, and synchronizing the fourth attribute information of the second object with the terminal.

5. The method according to claim 4, wherein the second attribute synchronization range of the second object increases to the third attribute synchronization range in response to detecting that the virtual object at the terminal completes a target task in the game.

6. The method according to claim 1, further comprising:
   detecting, by using a target pointer, that the virtual object is in a first area in which a first field-of-view manager and a second field-of-view manager coexist;
   obtaining first object attribute information synchronized with an object in the first field-of-view manager, the first object being located in the first field-of-view manager, and an attribute synchronization range of the object in the first field-of-view manager being the first attribute synchronization range; and
   obtaining, by using the target pointer, second object attribute information synchronized with an object in the second field-of-view manager, the second object being located in the second field-of-view manager, and an attribute synchronization range of the object in the second field-of-view manager being the second attribute synchronization range.

7. The method according to claim 1, wherein the synchronizing the first attribute information and the second attribute information with a terminal corresponding to the virtual object comprises:
   synchronizing the first attribute information with the terminal when the virtual object is in the first attribute synchronization range of the first object; and
   synchronizing the second attribute information with the terminal when the virtual object is in the second attribute synchronization range of the second object.

8. A server comprising a processor, a memory coupled to the processor and a plurality of computer programs stored in the memory that, when executed by the processor, cause the server to perform a plurality of operations comprising:
   identifying a virtual scene of a game currently running at the server, the virtual scene including a virtual object, a first object and a second object, wherein the first object and the second object are within a field of view of a virtual object;
   obtaining first attribute information of the first object and second attribute information of the second object, in response to detecting a change of attribute information of the first object and the second object;
   determining a first distance between the virtual object and the first object and a second distance between the virtual object and the second object; and
   synchronizing the first attribute information and the second attribute information with a terminal corresponding to the virtual object, when the first distance between the virtual object and the first object is within a first attribute synchronization range of the first object and the second distance between the virtual object and the second object is within a second attribute synchronization range of the second object, the first attribute synchronization range of the first object being greater than the second attribute synchronization range of the second object.

9. The server according to claim 8, wherein the plurality of operations further comprise:

after detecting that the virtual object moves out of the second attribute synchronization range of the second object, transmitting a notification message the terminal for removing the second object from the virtual scene.

10. The server according to claim 8, wherein the plurality of operations further comprise:
    after detecting that the virtual object moves into the second attribute synchronization range of the second object:
    obtaining third attribute information of the second object, the third attribute information being different from the second attribute information; and
    synchronizing the third attribute information of the second object with the terminal.

11. The server according to claim 8, wherein the plurality of operations further comprise:
    adjusting the second attribute synchronization range of the second object to a third attribute synchronization range, the third attribute synchronization range being greater than the second attribute synchronization range; and
    obtaining fourth attribute information of the second object when the virtual object is within the third attribute synchronization range of the second object, and synchronizing the fourth attribute information of the second object with the terminal.

12. The server according to claim 11, wherein the second attribute synchronization range of the second object increases to the third attribute synchronization range in response to detecting that the virtual object at the terminal completes a target task in the game.

13. The server according to claim 8, wherein the plurality of operations further comprise:
    detecting, by using a target pointer, that the virtual object is in a first area in which a first field-of-view manager and a second field-of-view manager coexist;
    obtaining first object attribute information synchronized with an object in the first field-of-view manager, the first object being located in the first field-of-view manager, and an attribute synchronization range of the object in the first field-of-view manager being the first attribute synchronization range; and
    obtaining, by using the target pointer, second object attribute information synchronized with an object in the second field-of-view manager, the second object being located in the second field-of-view manager, and an attribute synchronization range of the object in the second field-of-view manager being the second attribute synchronization range.

14. The server according to claim 8, wherein the synchronizing the first attribute information and the second attribute information with a terminal corresponding to the virtual object comprises:
    synchronizing the first attribute information with the terminal when the virtual object is in the first attribute synchronization range of the first object; and
    synchronizing the second attribute information with the terminal when the virtual object is in the second attribute synchronization range of the second object.

15. A non-transitory computer readable storage medium storing a plurality of computer programs in connection with a server having a processor, wherein the plurality of computer programs, when executed by the processor, cause the server to perform a plurality of operations including:
    identifying a virtual scene of a game currently running at the server, the virtual scene including a virtual object, a first object and a second object, wherein the first object and the second object are within a field of view of a virtual object;
    obtaining first attribute information of the first object and second attribute information of the second object, in response to detecting a change of attribute information of the first object and the second object;
    determining a first distance between the virtual object and the first object and a second distance between the virtual object and the second object; and
    synchronizing the first attribute information and the second attribute information with a terminal corresponding to the virtual object, when the first distance between the virtual object and the first object is within a first attribute synchronization range of the first object and the second distance between the virtual object and the second object is within a second attribute synchronization range of the second object, the first attribute synchronization range of the first object being greater than the second attribute synchronization range of the second object.

16. The non-transitory computer readable storage medium according to claim 15, wherein the plurality of operations further comprise:
    after detecting that the virtual object moves out of the second attribute synchronization range of the second object, transmitting a notification message the terminal for removing the second object from the virtual scene.

17. The non-transitory computer readable storage medium according to claim 15, wherein the plurality of operations further comprise:
    after detecting that the virtual object moves into the second attribute synchronization range of the second object:
    obtaining third attribute information of the second object, the third attribute information being different from the second attribute information; and
    synchronizing the third attribute information of the second object with the terminal.

18. The non-transitory computer readable storage medium according to claim 15, wherein the plurality of operations further comprise:
    adjusting the second attribute synchronization range of the second object to a third attribute synchronization range, the third attribute synchronization range being greater than the second attribute synchronization range; and
    obtaining fourth attribute information of the second object when the virtual object is within the third attribute synchronization range of the second object, and synchronizing the fourth attribute information of the second object with the terminal.

19. The non-transitory computer readable storage medium according to claim 18, wherein the second attribute synchronization range of the second object increases to the third attribute synchronization range in response to detecting that the virtual object at the terminal completes a target task in the game.

20. The non-transitory computer readable storage medium according to claim 15, wherein the plurality of operations further comprise:
    detecting, by using a target pointer, that the virtual object is in a first area in which a first field-of-view manager and a second field-of-view manager coexist;
    obtaining first object attribute information synchronized with an object in the first field-of-view manager, the first object being located in the first field-of-view manager, and an attribute synchronization range of the object in the first field-of-view manager being the first attribute synchronization range; and obtaining, by using the target pointer, second object attribute information synchronized with an object in the second field-of-view manager, the second object being located in the second field-of-view manager, and an attribute synchronization range of the object in the second field-of-view manager being the second attribute synchronization range.

* * * * *